2 Sheets—Sheet 1.
J. GOODRICH.
Tool for Grasping and Holding Articles.
No. 227,686. Patented May 18, 1880.
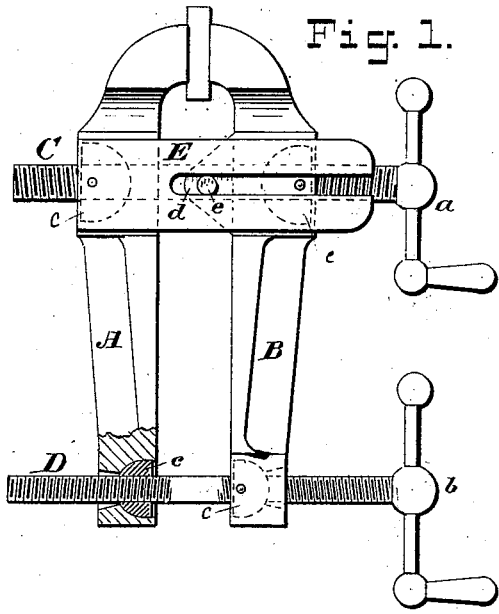
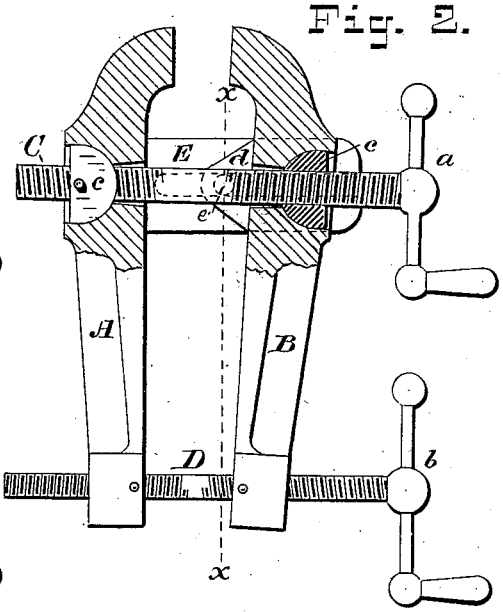
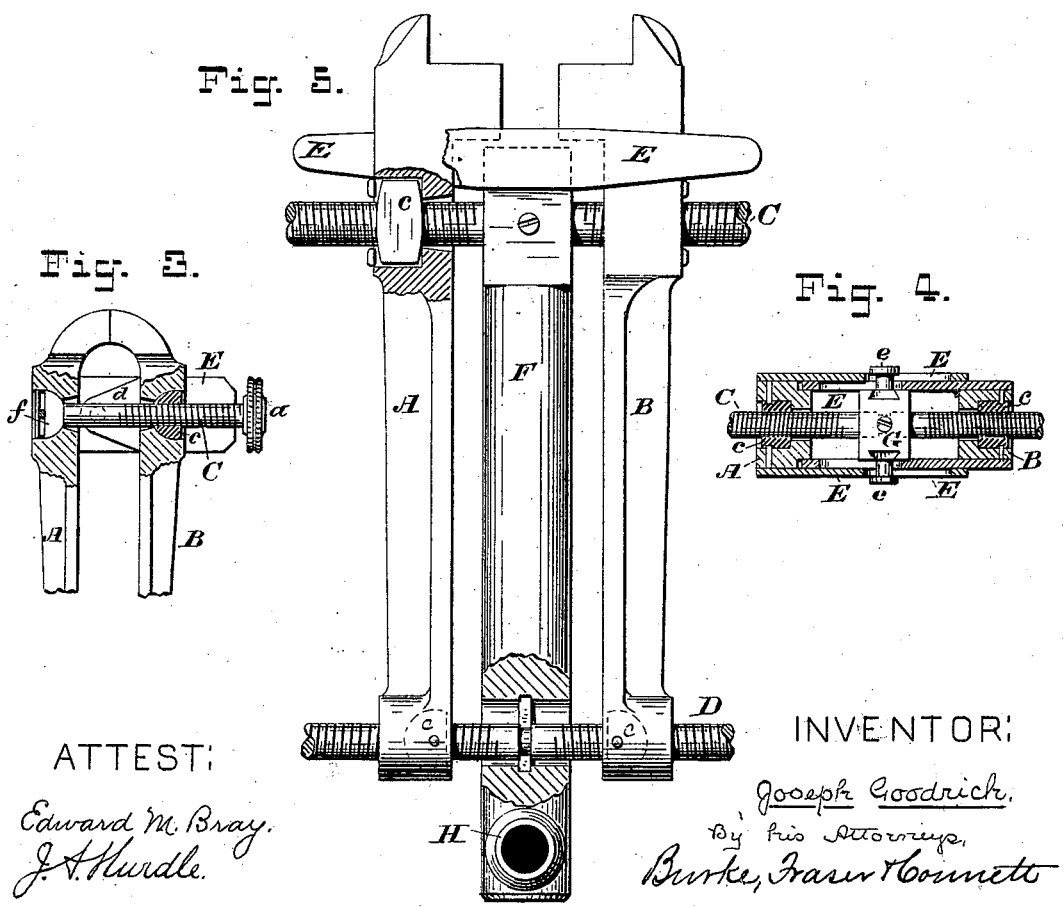
ATTEST:
Edward M. Bray.
J. H. Hurdle.
INVENTOR:
Joseph Goodrich.
By his Attorneys,
Burke, Fraser & Connett 2 Sheets—Sheet 2.

J. GOODRICH.
Tool for Grasping and Holding Articles.

No. 227,686.                    Patented May 18, 1880.

ATTEST:
Anna M. Fraser.
J. A. Hurdle.

INVENTOR:
Joseph Goodrich,
By his Attorneys,
Burke, Fraser & Conisett

UNITED STATES PATENT OFFICE.

JOSEPH GOODRICH, OF HENRY, ILLINOIS.

TOOL FOR GRASPING AND HOLDING ARTICLES.

SPECIFICATION forming part of Letters Patent No. 227,686, dated May 18, 1880.

Application filed January 17, 1880. Patented in England December 30, 1878, in France January 23, 1879, in Germany January 27, 1879, in Belgium February 15, 1879, and in Canada June 26, 1879.

*To all whom it may concern:*

Be it known that I, JOSEPH GOODRICH, of Henry, in the county of Marshall and State of Illinois, have invented certain Improvements in Tools for Grasping and Holding Articles, of which the following is a specification.

My invention relates to a tool which may be adapted for holding articles fast while being operated upon, and for holding nuts or screws while they are being driven or drawn, and for holding bits, drills, or other tools while being operated with.

A tool having some of the characteristics of my present invention is shown in my Patent No. 210,684, dated December 10, 1878; and I wish it understood that what was therein illustrated and claimed I make no claim to herein.

The novel features of my present invention consist, partly, in the employment, in a wrench, vise, or hold-fast having an adjusting-screw to adapt the jaws to the article clamped and a tail-screw or its equivalent for producing the final pressure, of a pivoted or rocking nut or nuts attached to the jaws for the screw or screws, whereby the jaws may be caused to stand at any desired angle with each other; also, in the employment of suitable guides or guide-plates for the jaws, whereby a central stock may be dispensed with; and also in various combinations of parts, all as will be more fully hereinafter set forth.

Figure 6:
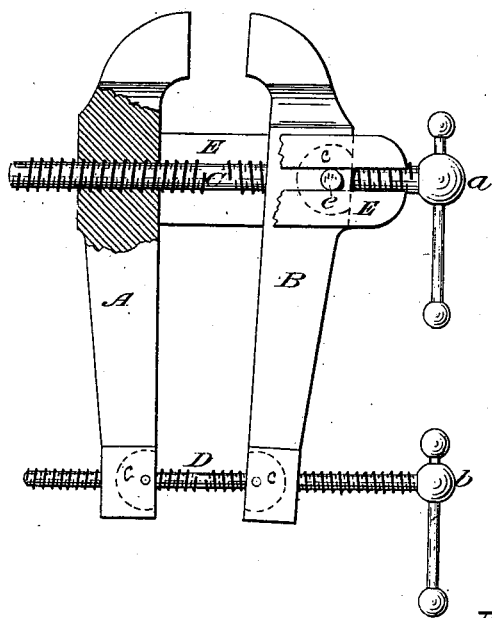
Figure 7:
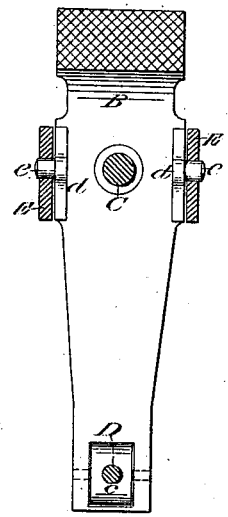
Figure 8:
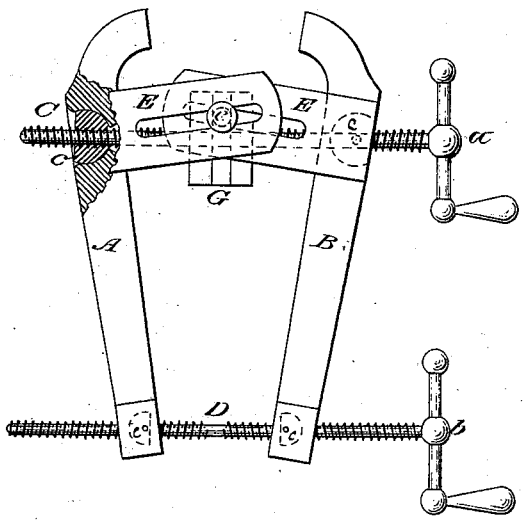

In the drawings, which serve to illustrate my invention, Figure 1 is a side elevation of a hand-vise constructed according to my invention, and Fig. 2 is a view of the same, partly in section, arranged to show the jaws open. Figs. 3, 4, 5, and 6 are views showing adaptations of the invention, which will be more fully hereinafter described. Fig. 7 is a vertical section taken in the plane of the line $x\ x$ in Fig. 2. Fig. 8 is a side elevation of the modification shown in Fig. 4.

Let A B represent the two jaws of a vise, C the adjusting-screw, and D the tail-screw for spreading the tails or extremities of the jaws. These screws have each a right-hand and a left-hand screw-thread, the two kinds of threads meeting, or nearly meeting, at the center. These screw-threads are arranged oppositely on the two screws, as will be seen by reference to the drawings, so that when the crank $a$ of the screw C is turned to the right it will bring the jaws together, while a corresponding movement of the crank $b$ of the screw D will cause the tails to separate.

The screws C D engage pivoted or rocking nuts $c\ c$, mounted in sockets in the jaws, and preferably arranged to turn on pins or pivots which secure them to the jaws. In some cases, however, the nuts may be rounded on their faces and be held in place simply by means of clips bent over them after their insertion, as shown in Fig. 5. This pivoting of the nuts enables the operator to set the jaws at almost any angle with each other that he pleases, and as the nut is securely fixed to the jaw the latter will follow the travel of the nut on the screw, whether moving in or out.

To the jaw A, or one of the jaws, are fixed two slotted guides, E, one on each side, arranged to embrace the other jaw, B, and to the latter jaw are fixed guide-plates $d$, bearing pins or studs $e$, which engage the slots of the guides E. I prefer to arrange these pins in the same plane with the face of the jaw B, but they may be arranged in various planes or positions with respect to the clamping-faces of the jaws. They are shown in Figs. 1 and 2 arranged in the plane of the face of the jaw B, the plates $d$ serving as brackets to support the pins $e$. If the screw C be caused to engage a fixed nut or thread in the jaw A, as it may do, then the pins $e$ should coincide with the pivotal axis of the nut $c$ in the jaw B, through which the screw C passes. This construction is clearly shown in Fig. 6, wherein it will be seen that the rocking nut for the screw C is dispensed with in the jaw A and the pins $e$ are arranged to coincide with the pivotal axis of the nut in B. In such a construction the guide-plates $d$ would not be required, and the pins $e$ might be secured directly to or in the jaw B.

In Fig. 3 I have shown a modification of the screw or screws in which only one thread is employed instead of right and left hand threads. In this construction the extremity of the screw is swiveled in the jaw A at $f$. This arrangement permits the screw to rotate and to vibrate vertically to a sufficient extent for all practical purposes, and in it I may employ a tail-screw of the same construction, or one constructed as shown in Fig. 1. In either case one or more pivoted nuts will be employed. In some cases—as in bench-vises, for instance—the nuts in one jaw need not be pivoted.

Fig. 4 is a horizontal section of a vise, taken through the jaws and guides in the plane of the screw C, and Fig. 8 is a side view of the same. This modification shows each jaw provided with slotted guides E, those on one jaw arranged to overlap those on the other, and the pins e e arranged to extend through both. The inner ends of these pins have heads arranged to play vertically in dovetail grooves or keepers in a block, G, through which the screw C passes. The screw turns freely in this block, but is prevented from moving endwise in the same by means of a set-screw or pin arranged to engage a circumferential groove in the screw. In some cases the block G may be omitted and the pins be provided with heads on both ends to retain them in the guide-slots.

Fig. 5 shows the application of the pivoted or rocking nut c to a bit-holder and tap-wrench constructed similarly to the tool described in my patent of December 10, 1878, before mentioned. In this figure A B are the jaws, C D the screws, F the central stock, and H the socket whereby it is secured to the brace-bar.

In my patent above mentioned the stock was squared and made to fit removably into the socket of an ordinary bit-brace; but in the construction herein shown I contemplate securing the brace-bar permanently to the stock by providing the socket H to receive the horizontal extremity of the bar, the stock and wrench taking the place of the ordinary bit-socket.

It will be understood that when the jaws of the vise or wrench are closed upon the article grasped, which adjustment is effected by means of the screw C, the jaws are brought together forcibly upon the object grasped by spreading the tails of the jaws. This may be accomplished by means of the screw D or by some other equivalent means.

I am aware that vises have been devised wherein rocking nuts of various kinds, entirely disconnected from the jaws, have been employed; but I am not aware that rocking nuts secured to or in the jaws, or nuts pivoted in the jaws, have been employed, whereby the jaw will be caused to move along the screw with the nut, as in the case of fixed nuts.

I claim—

1. The combination, with the jaw and screw of a tool for grasping and holding articles, of a pivoted or rocking nut securely fixed to and moving both in and out with the jaw, substantially as and for the purposes set forth.

2. The combination, in a tool for grasping and holding articles, of the jaws A B, one provided with the slotted embracing-guides E E and the other with pins e e, to engage the slots in the said guides, the nut or nuts c, screw C, and means for spreading the tails of the jaws, substantially as herein set forth.

3. The combination, to form a tool for grasping and holding articles, of the jaws A B, each provided with two pivoted or rocking nuts, c c, arranged as shown in Figs. 1 and 8, and secured to the jaws, two screws, C D, provided with right and left hand threads, and the slotted guides E E and pins e e, all arranged substantially as herein set forth.

4. The combination of the jaw A, provided with the slotted guides E on each side, the jaw B, provided with plates d d and pins or studs e e, the pins arranged to engage the slots in the guides, and the screws C and D, for bringing the jaws together, all arranged to operate substantially as set forth.

In witness whereof I have hereunto signed my name in the presence of two subscribing witnesses.

JOSEPH GOODRICH.

Witnesses:
 HENRY CONNETT,
 ARTHUR C. FRASER.